United States Patent
Muehleisen et al.

(10) Patent No.: US 11,463,853 B2
(45) Date of Patent: Oct. 4, 2022

(54) METHOD OF ALLOCATING SIDELINK RADIO RESOURCES TO A GROUP OF VEHICLES, IN A TELECOMMUNICATION NETWORK, WHEREIN VEHICLES WITHIN SAID GROUP OF VEHICLES INTENT TO USE SAID SIDELINK FOR VEHICLE-TO-VEHICLE, V2V, COMMUNICATION

(71) Applicant: Ericsson GmbH, Düsseldorf (DE)

(72) Inventors: Maciej Muehleisen, Eynatten (BE); Bastian Cellarius, Aachen (DE); Thorsten Lohmar, Aachen (DE); Congchi Zhang, Aachen (DE)

(73) Assignee: ERICSSON GMBH, Düsseldorf (DE)

( * ) Notice: Subject to any disclaimer, the term of this patent is extended or adjusted under 35 U.S.C. 154(b) by 40 days.

(21) Appl. No.: 16/094,217

(22) PCT Filed: Jul. 27, 2018

(86) PCT No.: PCT/EP2018/070419
§ 371 (c)(1),
(2) Date: Jan. 30, 2020

(87) PCT Pub. No.: WO2020/020465
PCT Pub. Date: Jan. 30, 2020

(65) Prior Publication Data
US 2021/0227364 A1    Jul. 22, 2021

(51) Int. Cl.
*H04W 4/46*    (2018.01)
*H04W 72/04*    (2009.01)
(Continued)

(52) U.S. Cl.
CPC .......... *H04W 4/46* (2018.02); *H04W 72/042* (2013.01); *H04W 72/14* (2013.01); *H04W 76/14* (2018.02)

(58) Field of Classification Search
None
See application file for complete search history.

(56) References Cited

U.S. PATENT DOCUMENTS

2016/0212596 A1* 7/2016 Brahmi ............... H04W 72/042
2016/0337867 A1* 11/2016 Uchino ................ H04W 16/14
(Continued)

OTHER PUBLICATIONS

International Search Report and Written Opinion of the International Searching Authority, PCT/EP2018/070419, dated Mar. 13, 2019, 13 pages.
(Continued)

*Primary Examiner* — Hong S Cho
(74) *Attorney, Agent, or Firm* — Sage Patent Group

(57) ABSTRACT

A method of allocating sidelink radio resources to a group of vehicles, in a telecommunication network, wherein vehicles within said group of vehicles intent to use said sidelink radio resources for vehicle-to-vehicle, V2V, communication, said method comprising the steps of receiving, by a V2V control entity residing in, or accessible via, a core network of said telecommunication network, a resource request, from said group of vehicles, for requesting radio resources to be used for said V2V communication, determining, by said V2V control entity, radio resources to be used for said V2V communication, transmitting, by said V2V control entity, to said group of vehicles, a resource grant comprising said determined radio resources.

20 Claims, 9 Drawing Sheets

(51) Int. Cl.
    *H04W 72/14*     (2009.01)
    *H04W 76/14*     (2018.01)

(56) References Cited

U.S. PATENT DOCUMENTS

2017/0289986 A1* 10/2017 Jin .................... H04W 72/0406
2018/0234898 A1* 8/2018 Kahtava ............... H04W 36/32

OTHER PUBLICATIONS

Zte, "Geo based Resource Allocation for V2V over PC5", 3GPP TSG RAN WG2 #94, Nanjing, China, May 23-27, 2016, R2-163824, XP051089671, 5 Pages.

\* cited by examiner

METHOD OF ALLOCATING SIDELINK RADIO RESOURCES TO A GROUP OF VEHICLES, IN A TELECOMMUNICATION NETWORK, WHEREIN VEHICLES WITHIN SAID GROUP OF VEHICLES INTENT TO USE SAID SIDELINK FOR VEHICLE-TO-VEHICLE, V2V, COMMUNICATION

A method of allocating sidelink radio resources to a group of vehicles, in a telecommunication network, wherein vehicles within said group of vehicles intent to use said sidelink for vehicle-to-vehicle, V2V, communication

CROSS REFERENCE TO RELATED APPLICATIONS

This application is a 35 U.S.C. § 371 national stage application of PCT International Application No. PCT/EP2018/070419 filed on Jul. 27, 2018, the disclosure and content of which is incorporated by reference herein in its entirety.

FIELD OF THE INVENTION

The present invention is directed to the field of Vehicle-to-vehicle communication, and, more specifically, to the allocation of radio resources to groups of vehicles for mitigating interference.

BACKGROUND

Vehicle-to-everything, V2X, communication relates to the exchange of information from a vehicle to any entity that may affect the vehicle, and vice versa. It is considered a vehicular communication system that may incorporate other more specific types of communication such as Vehicle-to-Infrastructure, V2I communication, Vehicle-to-network, V2N communication, Vehicle-to-vehicle, V2V communication, Vehicle-to-Pedestrian, V2P communication, Vehicle-to-device, V2D communication, and Vehicle-to-grid, V2G communication. The present disclosure is most prominently directed to the V2V communication.

The basic motivations for V2X are directed to safety and energy savings. The challenges in this field are related to legal issues and the fact that, unless almost all vehicles adopt it, its effectiveness may be limited.

Basically, there are two types of sidelink V2X communication technologies depending on the underlying technology being used: Network assisted which is referred to as Mode 3 communication and an ad-hoc mode which is referred to as Mode 4 communication.

Mode 4 supports decentralized resource assignment where UEs, i.e. vehicles that are able to communicate, are solely responsible for selecting transmission/radio resources. If more than one UE in close proximity uses the same resources data loss is very likely. Mode 3 lets the base station, for example the eNodeB, decide on resource selection. It can therefore schedule resources in a way preventing more than one UE in close proximity to use the same resources. The drawback here relates to increased latency since UEs must request resources from the eNB and additional implementation effort in all eNBs.

The original V2X communication uses a wireless communication technology and works directly between vehicles, which form a vehicular ad-hoc network (Mode 4) as two V2X senders come within each other's range. Hence it does not require any infrastructure for vehicles to communicate, which may assure safety in remote or little developed areas. This is also referred to as LTE-V2X sidelink mode 3.

More recent, V2X communication uses a telecommunication network and is called Cellular V2X/mode 3, or C-V2X/Mode 3, to differentiate it from the ad-hoc based V2X/mode 4. In 3GPP Release 15, the V2X functionalities are expanded to support 5G. The main advantage of C-V2X includes support of both direct communication between vehicles, V2V, and traditional cellular-network based communication.

One of the drawbacks of Mode 4 relates to the implementation part thereof. Supporting Mode 3 requires implementation changes to all base station, i.e. eNB's, and, even then, interference among UEs, i.e. among vehicles, served by different eNBs cannot be prevented. The result is high and especially unpredictive packet loss. Safety of life critical use cases are then not well supported.

SUMMARY

It is an object of the present disclosure to provide for a method for allocating radio resources to a group of vehicles which does not require implementation changes to all base station, and which has improved frequency allocation techniques such that interference is reduced.

It is another object of the present disclosure to provide for a V2V control entity arranged for allocating the radio resources to groups of vehicles.

In a first aspect, there is provided a method of allocating sidelink radio resources to a group of vehicles, wherein vehicles within said group of vehicles intent to use said sidelink radio resources for vehicle-to-vehicle, V2V, communication.

The method comprising the steps of:
receiving, by a V2V control entity residing in, or accessible via, a core network of said telecommunication network, a resource request, from said group of vehicles, for requesting radio resources to be used for said V2V communication;
determining, by said V2V control entity, radio resources to be allocated for said V2V communication;
transmitting, by said V2V control entity, to said group of vehicles, a resource grant comprising said determined allocated radio resources.

It was found that a V2V control entity residing in, or accessible via, a core network of the telecommunication network may be useful in allocating the resources for the groups of vehicles for a plurality of reasons.

The V2V control entity may thus reside in a private or public data network accessible from the telecommunication network.

First, the existing base stations, i.e. eNodeB's, do not need to be updated to support any radio resource allocation algorithm. The baste stations do not perform the radio resource allocation. In the presented method, the base stations merely forward message from the group of vehicles to the V2V control entity, and vice versa. This thus requires less implementation effort.

Further, the V2V control entity is able to communicate with each of the groups of vehicles that are connected to the radio base stations in the telecommunication network. This allows the V2V control entity to allocate radio resources much more efficiently, especially in situations in which a group of vehicles is on the edge of a cell served by a particular base station. The V2V control entity may be aware of the radio resources that are allocated to groups of vehicles in the neighbouring cells of that particular cell, i.e. groups of vehicles served by another base station, and may use that information for actually determining which radio resources are to be allocated for the group of vehicles on the edge of a cell.

In accordance with the present disclosure, a group of vehicles may be formed using multiple principles.

The group of vehicles may be established on an ad-hoc basis, wherein a particular vehicle transmits discovery messages to vehicles that are in its proximity, and, based on the discovery responses, the particular vehicle may be included in a group or a new group may be established.

Another option is that the formation of a group is centralized, or coordinated, by the telecommunication network. The telecommunication network may receive all kinds of geographical position information of vehicles, and even the intended routes of these vehicles, and may form the groups of vehicles based on the received information.

It is further noted that the step of determining the radio resources to be used by the group for V2V communication typically includes algorithms for ensuring that assigned radio resources to different groups do not likely interfere with each other, which is explained in more detail with respect to specific examples later below.

It is noted that a group of vehicles, for example a platoon, may consist of a single vehicle or a plurality of vehicles. Each of the vehicles in the group is at least arranged for V2V communication.

According to the present disclosure a telecommunication network comprises a core network and one or more Radio Access Networks, RAN's. The V2V control entity resides in the core network, or the V2V control entity is reachable via the core network, such that each base station, i.e. eNB, in the RAN is able to have access the V2V control entity. The V2V control entity may thus also reside in a private or public data network, wherein a gateway present in the core network provides connectivity to the private or public data network. The V2V control entity may be a standalone entity, or the functionality of the entity may be comprised by an already existing entity/node in the telecommunication network.

In an example, the resource request comprises a position indication for indicating a geographical position of said group of vehicles, and, optionally. comprises a route indication for indicating a route of said group of vehicles, and wherein said step of determining comprises:

determining, by said V2V control entity, said radio resources to be used for said V2V communication based on said position indication and, optionally, said route indication.

Each vehicle in the group of vehicles may, for example, receive position updates from a positioning sensor. The positioning sensor is, for example, a Global positioning system, GPS, sensor or anything alike. The position of the group of vehicles may be defined as the center of the circular area of interference of the group of vehicles.

Typically, a single vehicle in the group of vehicles communicates with the V2V control entity, and the information exchanged with the V2V control entity may be communicated by that single vehicle to the remaining vehicles in the group using V2V communication.

The particular vehicle communicating with the V2V control entity may insert a geographical position of the group in the resource request. The geographical position of the group may be its own geographical position, i.e. the geographical position of the particular vehicle, or may be a geographical position derived from all the position updates from the positioning sensors.

For example, each vehicle in the group may broadcast its geographical position, obtained from the positioning sensor, within the group of vehicles using V2V communication. The particular vehicle, i.e. the one that communicates with the V2V control entity, may collect all these geographical positions of all the vehicles within the same group, and may determine a central geographical position which is considered a central location of the group. That central geographical position may then, subsequently, be included in the resource request which is transmitted to the V2V control entity.

A similar approach may be valid for the route of the groups of vehicles. The particular vehicle may use route information, for example from a navigation system or the like, and may include that route information in the request such that the V2V control entity is able to provide for a more balanced, efficient, allocation scheme.

In a further example, the entity comprises a database having stored therein allocated radio resources, wherein each allocated radio resource is associated with a geographical area indication, and wherein said step of determining comprises:

determining, by said entity, said radio resources to be used for said V2V communication based on said allocated radio resources per geographical area.

The above described example is advantageous as the V2V control entity is able to oversee all groups of vehicles within the telecommunication network, and is thus able to determine the radio resources to be used for said V2V communication based on the already allocated radio resources within the telecommunication network.

As mentioned before, a solution in which the resource allocation is performed by the base station is not preferred as the base station is only able to oversee the groups of vehicles within the cell it is serving. The solution in accordance with the present disclosure is able to oversee all cells in the telecommunication network, and is thus also aware of the radio resource allocations performed in neighbouring cells of a particular group of vehicles. This information may be used in determining, i.e. selecting, the radio resources for a particular group of vehicles.

In a further example, said step of determining comprises:

determining, by said entity, a geographical area indication for which said radio resources are granted to be used based on said stored allocated resources, and wherein said step of transmitting comprises:

transmitting, by said V2V control entity, to said group of vehicles, a resource grant comprising said determined geographical area indication for which said radio resources are valid.

It was found that it may be beneficial to provide a geographical area indication for which the radio resources are valid. Once the group of vehicles travels outside the geographical area indication, the allocated resources may no longer be used.

The V2V control entity may have determined that the allocated resources may be used for a particular geographical area indication, but that the allocated resources should not be used outside that area as that could cause interference with other groups of vehicles, i.e. with radio resource allocations to other groups of vehicles.

In yet another example, the resource grant comprises a grant renewal period indicator indicating a time period for which said determined allocated radio resources are granted to be used.

The above described example may be used solely, or, for example, in combination with the geographical are indication as described above.

It was found that the group of vehicles typically traverse a particular route. The more time has passed since the allocation of the radio resources, the greater the risk for interference from other groups of vehicles, i.e. from radio resources which are allocated to other groups of vehicles. It may therefore be beneficial to set a particular grant renewal period, such that the V2V control entity is to determine the radio resources again once the grant renewal period has expired.

In a further example, the resource grant comprises a geographical area indication for which said determined radio resources are granted to be used, and wherein said method comprises the steps of:
receiving, by said V2V control entity, a tile left message thereby indicating that said group of vehicles are no longer within, or bound to leave, said geographical area indication such that said allocated resources for said group of vehicles may be freed.

The V2V control entity may base the decision on which radio resources are to be allocated for the particular group of vehicles on the actual location of the group of vehicles and the distribution, over the geographical area, of radio resources that have already been allocated to other groups of vehicles. The V2V control entity is then able to reasonably assess that the likelihood on interference is reduced as long as the group of vehicles stays within the geographical area indication.

The allocated radio resources may no longer be valid once the group of vehicles traversed to outside the geographical area indication as that would increase the likelihood to interference from other groups of vehicles.

In a further example, the radio resources comprise any of:
a frequency allocation,
a channel allocation,
a timeslot allocation,
a timeslot pattern allocation,
subcarrier allocation, and
Physical Resource Blocks, PRBs, forming Transport Blocks, TBs, carrying transmitted data.

As mentioned above, the present disclosure is directed to a method for reducing the likelihood to interference during V2V communication within a group of vehicles. Interference may be caused by other vehicles that are in the proximity of that particular group. Interference may be caused when those other vehicles transmit at the same time, and at the same frequency as the vehicles within the group.

Following the principle above, the radio resources are directed to frequency, time, or code allocations such that the likelihood to interference is reduced.

In a second aspect, there is provided a V2V control entity arranged to be operative in, or reachable via, a core network of a telecommunication network, and arranged for allocating sidelink radio resources to a group of vehicles, wherein vehicles within said group of vehicles intent to use said sidelink radio resources for vehicle-to-vehicle, V2V, communication.

The entity comprising:
receive equipment arranged for receiving, a resource request, from said group of vehicles, for requesting radio resources to be used for said V2V communication;
process equipment arranged for determining radio resources to be used for said V2V communication;
transmit equipment arranged for transmitting, to said group of vehicles, a resource grant comprising said determined radio resources.

A plurality of V2V entities may be employed to cover a particular geographical area. The present disclosure is not limited to the actual size of the geographical area that is covered by a single V2V entity.

The functionality of the V2V entity may be incorporated in a node which is already defined in a 5G telecommunication network, like the AMF or the PCF.

The advantages of the first aspect of the disclosure are also inherently a part of the second aspect, and third aspect, of the disclosure. Furthermore, it is pointed out that although the claims read as if all the modules/equipment according to this second aspect of the present disclosure are incorporated into a single entity/node, a person skilled in the art understands that the same disclosure could be implemented by, for example, distributing each of the modules over several nodes. Alternately, the disclosure could also be purely implemented in the cloud, whereby none of the physical nodes possess any of these modules/equipment as such.

In an example, the resource request comprises a position indication for indicating a geographical position of said group of vehicles, and, optionally, comprises a route indication for indicating a route of said group of vehicles, and wherein said process equipment is further arranged for:
determining said radio resources to be used for said V2V communication based on said position indication and, optionally, said route indication.

In a further example, said entity comprises a database having stored therein allocated radio resources per geographical area indication, and wherein said process equipment is further arranged for:
determining said radio resources to be used for said V2V communication based on said allocated radio resources per geographical area.

In yet another example, the process equipment is further arranged for
determining a geographical area indication for which said radio resources are valid based on said stored allocated resources per geographical area.
and wherein said transmit equipment is further arranged for:
transmitting, to said group of vehicles, a resource grant comprising said determined geographical area indication for which said radio resources are valid.

In an example, the resource grant comprises a grant renewal period indicator indicating a time period for which said determined allocated radio resources are granted to be used.

In a further example, the resource grant comprises a geographical area indication for which said determined radio resources are valid, and wherein said receive equipment is further arranged for:
receiving a tile left message thereby indicating that said group of vehicles are no longer within, or bound to leave, said geographical area indication such that said allocated resources for said group of vehicles may be freed.

In yet another example, the radio resources comprise any of:
a frequency allocation,
a channel allocation,
subcarrier allocation,
a timeslot allocation,
a timeslot pattern allocation, and Physical Resource Blocks, PRBs, forming Transport Blocks, TBs, carrying transmitted data.

In a third aspect, there is provided a system arranged to be operative in, or reachable via, a core network of a telecommunication network, or in a private or public data network which is reachable via the core network of the telecommunication network, and arranged for allocating sidelink radio resources to a group of vehicles, wherein said system comprises a plurality of entities in accordance with any of the examples as provided above, wherein each of said entities are separate, distinctive, entities for improving redundancy.

In a fourth aspect, there is provided a computer program product comprising a computer readable medium having instructions which, when loaded by a V2V control entity in a core network of a telecommunication network, or in a data communication network which is reachable via said core network, cause said V2V control entity to perform a method in accordance with any of the method examples as provided above.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
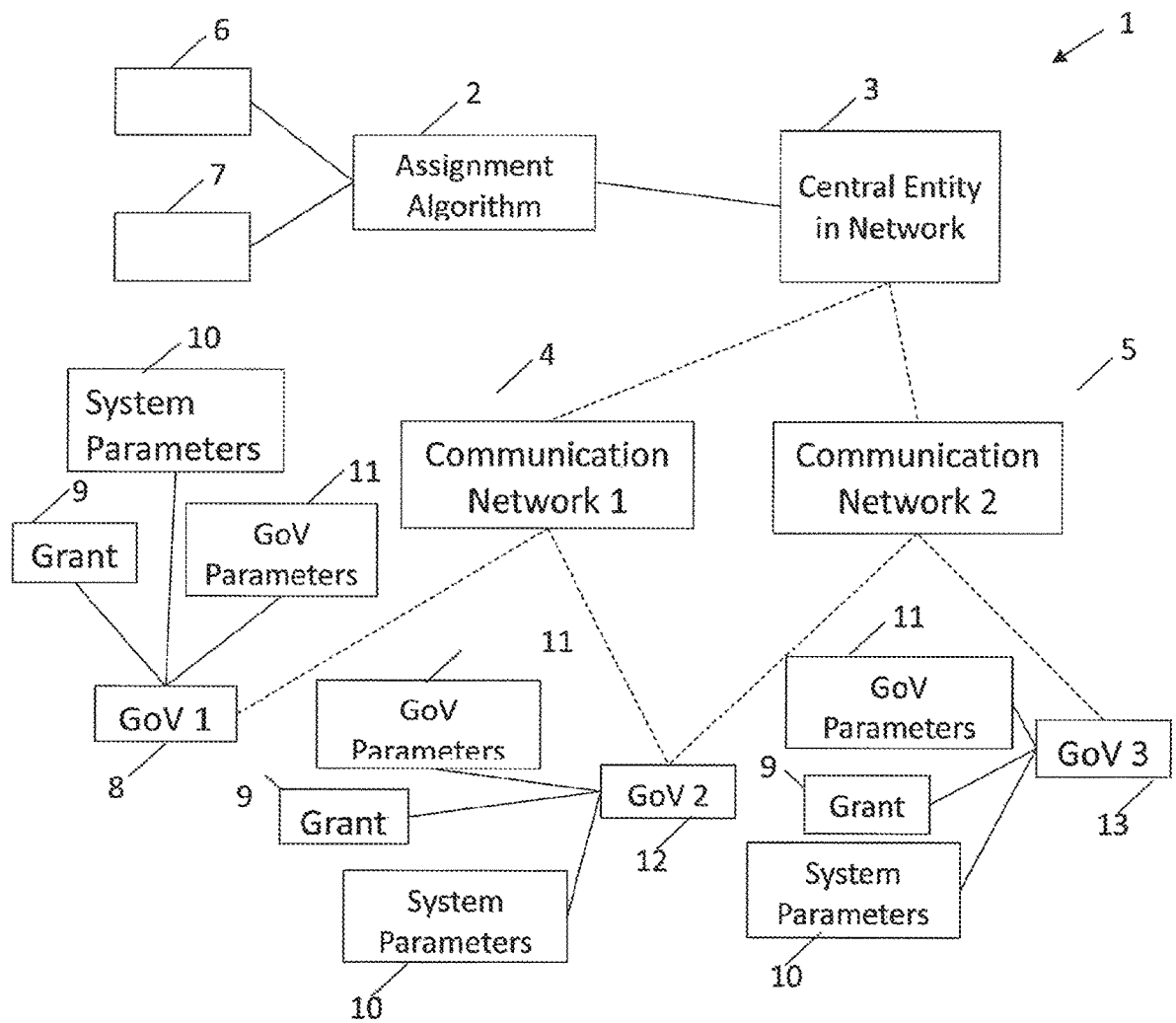
FIG. 1 discloses an architecture in accordance with the present disclosure.

FIG. 1 discloses an architecture 1 in accordance with the present disclosure.

The present architecture 1 discloses three group of vehicles as indicated with reference numerals 8, 12 and 13. These group of vehicles may be connected to a first communication network 4 or a second communication network 5. These communication networks are, for example, Radio Access Networks, RAN's, or anything alike.

In any case, each group of vehicles 8, 12, 13 is able to access a V2V control entity 3 in a telecommunication network, wherein the V2V control entity 3 resides in, or is reachable via, a core network of the telecommunication network. The V2V control entity 3 thus does not reside in a Radio Access Network, RAN.

The V2V control entity 3 in the telecommunication network is responsible for assigning radio resources to each of the groups of vehicles, wherein the assigned radio resources may be used by the vehicles within a group for intra-communication. That is, for communication between vehicles in the same group.

The present disclosure is directed to a concept in which radio resources can be allocated to different groups of vehicles 8, 12, 13, wherein the probability that interference occurs between these group of vehicles 8, 12, 13 is reduced. As such, group vehicles that are located adjacently to each other, i.e. geographically close to each other, may be assigned orthogonal radio resources such that they do not disturb each other.

As mentioned above, each group of vehicles 8, 12, 13 is arranged to communicate with the V2V control entity 3. This may be accomplished in several manners. First, a leader in the group may be assigned, and the leader communicated with the V2V control entity 3 on behalf of the group. The information exchanged with the V2V control entity 3 may then be communicated to the other members of the group using V2V communication. Another option is that each of the members of the group communicate directly to the V2V control entity 3.

All vehicles belonging to the same group of vehicles may share the same identifier. The identifier is unique among all groups of vehicles and allows the V2V control entity of a network to identify which group of vehicles a particular vehicle belongs to. One method of assuring uniqueness is assigning unique IDs to each vehicle, e.g. during the manufacturing process. Upon formation of the group of vehicles the identifier of one of the first vehicles joining the group may be selected as the identifier for the entire Group of Vehicles. In case the vehicle leaves the group of vehicles a new identifier may be selected and the V2V control entity in the network may be informed about the changed identifier Each of the groups of vehicles 8, 12, 13 may be associated with a grant 9, system parameters 10 and group of vehicle parameters 11. The grant 9 may indicate the radio resources that are actually allocated to the group of vehicles, may indicate the geographical area indication for which the assigned radio resources are valid, and may indicate the time the grant was received.

The system parameters 10 may indicate the maximum velocity of the associated group of vehicles, may indicate the maximum time the grant is valid, i.e. the grant renewal period indicator, and may indicate the area of interference radius.

The group of vehicle parameters 11 may indicate the current position of the group, may indicate the last position update time of the particular group and may indicate the current route of the group.

The V2V control entity 3 is arranged to assign/allocate the radio resources for each of the groups of vehicles 8, 12, 13 based on an assignment algorithm 2. The assignment algorithm 2 may base the allocation of the radio resources on two aspects as indicated with reference numerals 6 and 7.

The first aspect 6 indicates that, for each group of vehicles, the assignment algorithm 2 may take into account the already assigned sidelink radio resources to other groups of vehicles, the last known position of the group of vehicles, the route of the group of vehicles, and the time of last position update of the group of vehicles.

The second aspect 7 indicates the sidelink radio resources that are not assigned to any of the group of vehicles. As such, these radio resources are free to be used by the V2V control entity 3 for allocating them to a group of vehicles.

Figure 2:
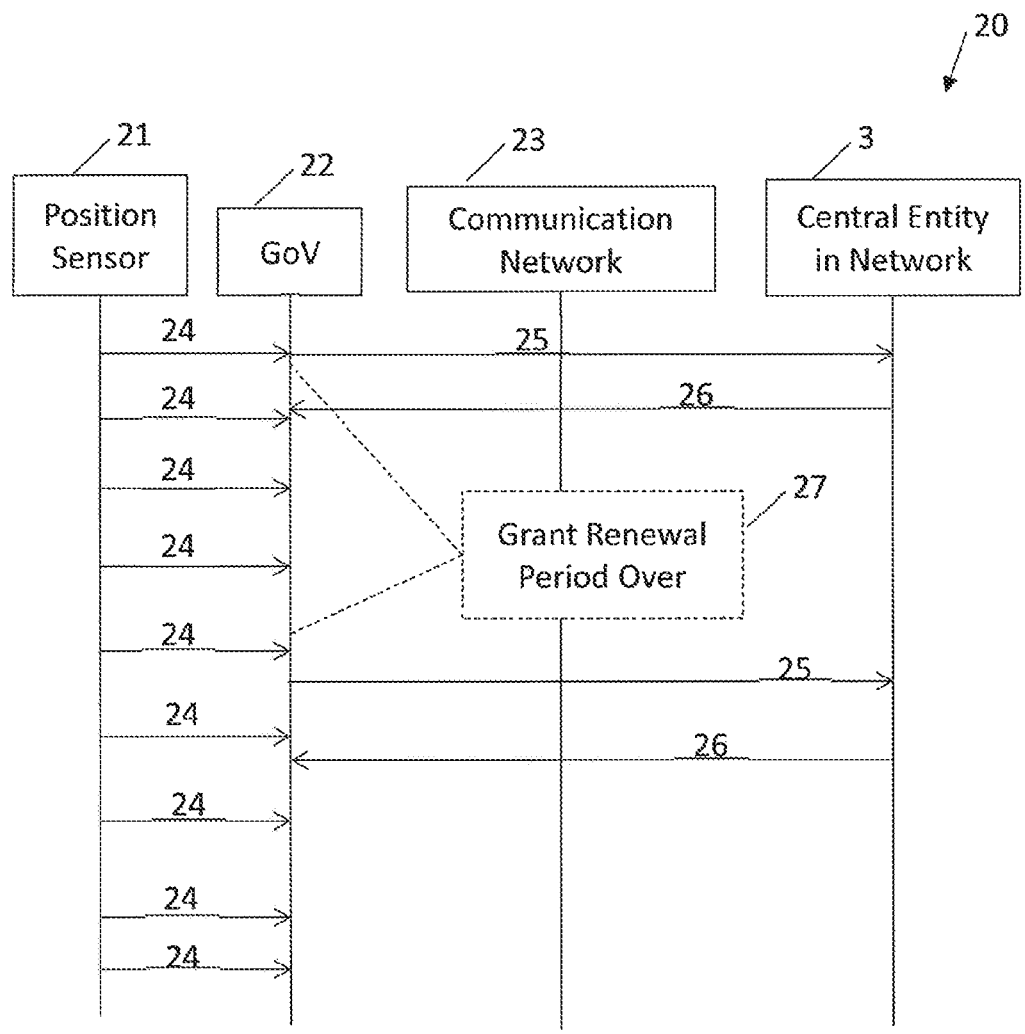
FIG. 2 discloses a flow chart illustrating messages exchanged between a group of vehicles and a V2V control entity in accordance with the present disclosure.

FIG. 2 discloses a flow chart 20 illustrating messages exchanged between a group of vehicles and a V2V control entity in accordance with the present disclosure.

The flow chart 20 indicates a position sensor 21 and a group of vehicles 22. The group of vehicles block 22 is responsible for communicating with the V2V control entity 3 in the telecommunication network. As mentioned above, the group of vehicles 22 may be a single vehicle that communicates with the V2V control entity 3 on behalf of the group.

Based on the information exchanged 24 between position sensors 21 of a plurality of vehicles, a group of vehicles 22 may be formed. The group of vehicles 22 is typically a group in which the vehicles are in the proximity of each other and that travel the same, or similar, route. In any case, the vehicles within the group of vehicles intend, or may intend, to directly communicate with each other using V2V communication techniques.

In order to do so, the vehicles within the group 22 need to be assigned radio resources which they can use for the V2V communication. They should not use random radio resources as that could pose a possible interference issue with other group of vehicles. As such, the allocation of the radio resources to the group of vehicles is performed by a V2V control entity 3 which oversees all group of vehicles in the telecommunication network, and all assigned/allocated radio resources therefor.

In a first step 25, the group of vehicles 22 transmits a resource request, which is received by the V2V control entity 3, for requesting radio resourced to be used for the V2V communication. The resource request is sent via a base station, for example an eNB, to the V2V control entity 3.

The resource request may contain any form of information which may be helpful to the V2V control entity 3 in deciding which radio resources to allocate for the particular group of vehicles 22. For example, the resource request may comprise a position indication for indicating a geographical position of said group of vehicles, and, optionally, comprises a route indication for indicating a route of said group of vehicles.

The V2V control entity 3 may then determine the radio resources to be used for the V2V communication for that particular group. The determination may be based on any of the information received in the resource request, as well as based on information with respect to radio resources that have already been allocated to other groups of vehicles.

Finally, the V2V control entity 3 transmits, to the group of vehicles 22, a resource grant comprising the determined radio resources. The present flow chart 20 illustrates an example in which the resource grant comprises a grant renewal period indicator 27 indicating a time period for which said determined radio resources are valid.

Once the time period for which said determined radio resources are valid has lapsed, the process of requesting the radio resources may start over again. That is, the group of vehicles 22 may transmit another request for radio resources 25, and may receive a further resource grant. The further resource grant may comprise the same radio resources as was the case for the initial resource grant, or may comprise other radio resources.

Figure 3:
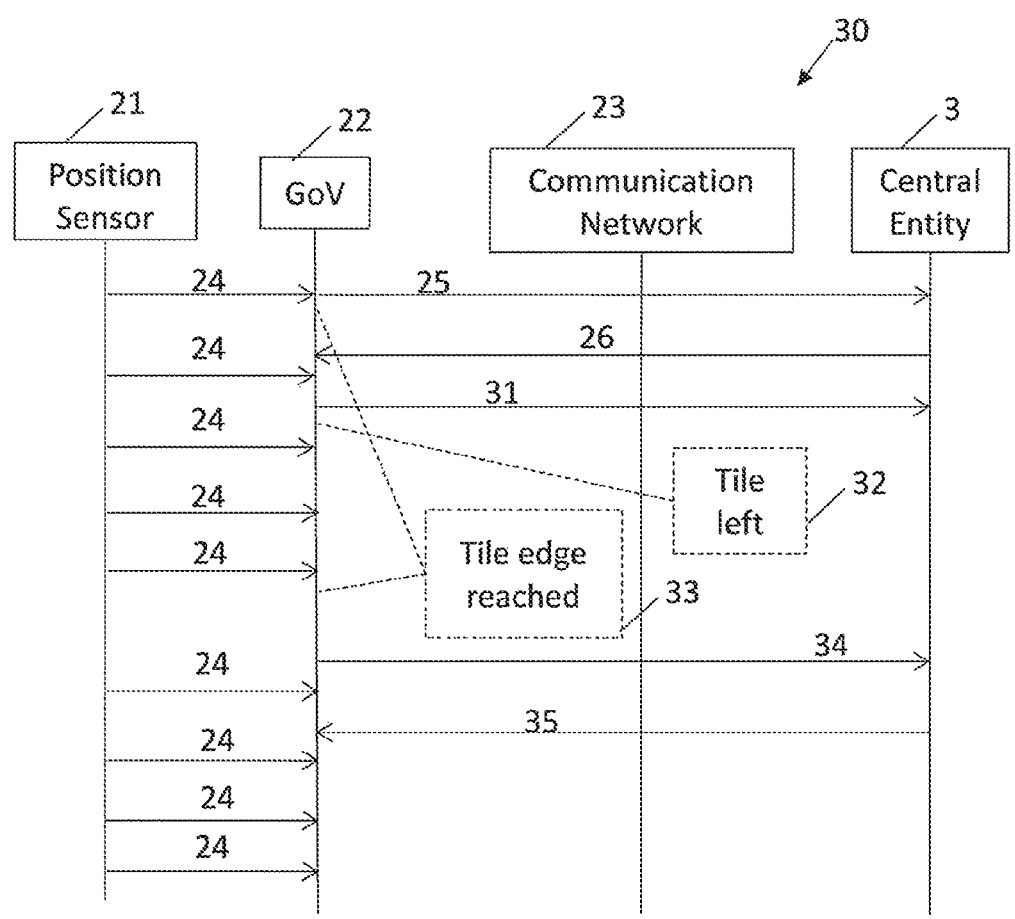
FIG. 3 discloses another flow chart illustrating messages exchanged between a group of vehicles and a V2V control entity in accordance with the present disclosure.

FIG. 3 discloses another flow chart 30 illustrating messages exchanged between a group of vehicles and a V2V control entity in accordance with the present disclosure.

The group of vehicles 22 may receive position updates from a positioning sensor 21. The position of a group of vehicles 22 may be defined as the center of the circular area of interference of the group of vehicles, which is explained in more detail here below.

With this position it can determine its location within a geographic tile. Tiles are typically shaped rectangularly, but any polygon is applicable as long as every geographic coordinate belongs to one tile. During normal operation mode, a group of vehicles issues a ResourceRequest 25 to the V2V control entity 3 in the network whenever it reaches the edge of at least one new tile. Reaching the edge means the area of interference of the group of vehicles may soon overlap with a different than the current tile or tiles. The ResourceRequest 25 is sent at a point in time assuring with high probability that the ResourceGrant message 26 will arrive before the area of interference of the group of vehicles may overlap with any other than the current tile or tiles. Current tiles are the ones for which the group of vehicles has received a resource grant and has not sent a TileLeft message as described below.

The ResourceRequest 25 may include the amount of requested radio resources, position and route of the group of vehicles.

If available, the V2V control entity 3 in the network will grant radio resources to be used in the new tile or tiles as indicated in the "Tile IDs" parameter of the ResourceGrant message 26. The V2V control entity 3 in the network may determine the new tile or tiles through the position and route. The ResourceGrant message 26 may also include the maximum geographic area, i.e. Max. Geographic Area, where the radio resources may be used. This area may at least include the current and new tiles but can also be larger.

The group of vehicles may inform the V2V control entity in the network when its area of interference does not overlap with the area of a tile anymore through a TileLeft message 31. From this point in time on the radio resources are considered unused in the respective tile.

In case no ResourceGrant message 26 is received before, for example, the area of interference overlaps with one or more new tiles, the group of vehicles may start operating in network failed mode. It may continue using the previously assigned resources as long as its area of interference is not outside of the Max. Geographic Area provided when the radio resources were granted. It can continue sending ResourceRequest messages to the network and may return to normal operation when receiving a ResourceGrant message while the interference area is fully within the Max. Geographic Area. The group of vehicles may not be allowed to transmit on the granted radio resources when it cannot confidently determine its area of interference is fully within the Max. Geographic Area.

The communication system of the group of vehicles may inform the application that it is in network failed mode and may provide an estimate how long communication can continue according to the estimated time when the Max. Geographic Area boundary will be reached. For this, information about the route from the navigation system can be used. The estimate how long communication can continue, may regularly be updated according to a current position of the group of vehicles and speed. An updated time to failure may be larger but not smaller than the previous one.

In case the positioning system fails, which can be e.g. determined by not receiving a position update within a certain time, the group of vehicles may enter positioning system failed mode. It does not make any difference whether this mode was entered from normal operation or network failed mode. It determines the maximum time it may continue using the granted radio resources without operational positioning system. The maximum time may not be lower than the time needed to traverse the minimum Euclidian distance between the closest edge of the Max. Geographic Area and the area of interference at maximum velocity. The maximum velocity may be a system wide parameter also used to determine the Max. Geographic Area. The communication system may inform the application about this maximum time so the application can prepare for the potential loss of connectivity.

Figure 4:
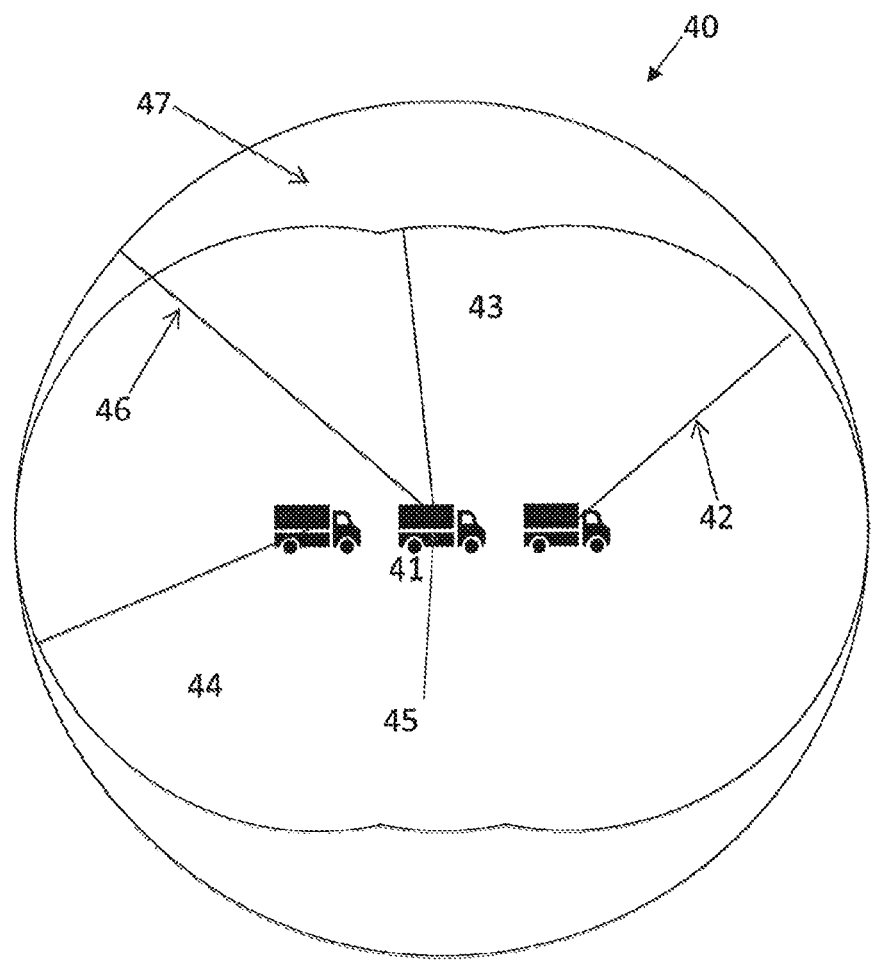
FIG. 4 discloses an example of an interference area of a group of vehicles.

FIG. 4 discloses an example 40 of an interference area of a group of vehicles 47.

By defining a maximum transmission power, limiting antenna directivity and applying a conservative radio power attenuation model the radius of the area of interference around a group of vehicles may be defined. The position of the group of vehicles is selected in a way that according to above properties, i.e. maximum transmission power, antenna pattern, and channel model, any received power outside of the area of interference is below a defined threshold. The threshold is selected in a way that received power, emitted by the group of vehicles, may, with very high probability, not prevent successful reception of transmissions on the same radio resources outside the area of interference e.g. by being significantly below the noise floor.

In FIG. 4, reference numeral 42 indicates the interference radius of a first vehicle of the group of vehicles. Reference numeral 43 indicates the interference radius of a second vehicle of the group of vehicles and reference numeral 44 indicates a third interference radius of a third vehicle in the group of vehicles. Reference numeral 46 may indicate the deduced, i.e. calculated, radius of the interference of the group of vehicles.

FIGS. 5-8 disclose an example in which a group of vehicles request resources, and wherein the group of vehicles traverse multiple tiles.

Figure 5:
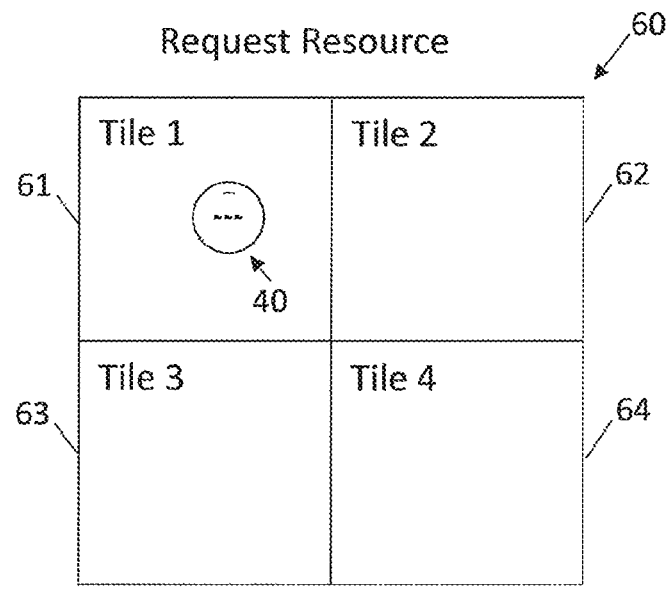
FIGS. 5-8 disclose an example in which a group of vehicles request resources, and wherein the group of vehicles traverse multiple tiles.
Figure 6:
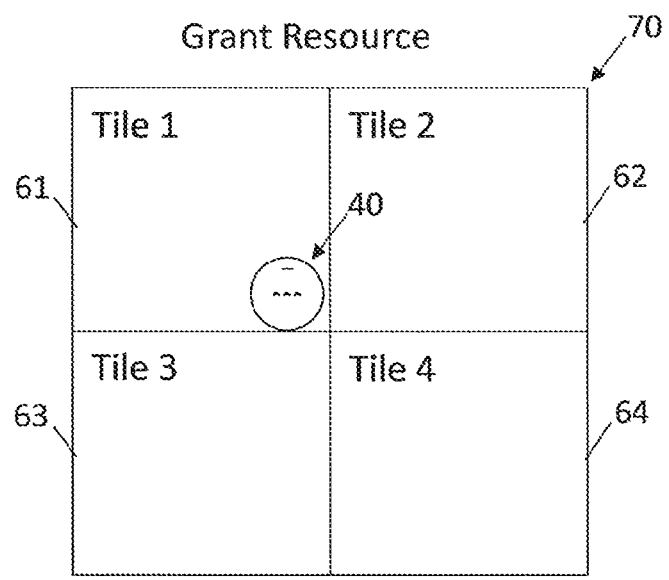

FIG. 5 discloses a situation 60 in which a particular area is divided into four different tiles, as indicated with reference numerals 61, 62, 63 and 64. The group of vehicles 40 request radio resources when the group of vehicles resides in a first tile.

A grant is received, from the V2V control entity 3, thereby indicating the radio resources that may be used by the vehicles of the group of vehicles 40, wherein the grant indicates that the radio resources may only be used whenever the group of vehicles are located within the first tile 3. This aspect is shown 70 in FIG. 6.

Figure 7:
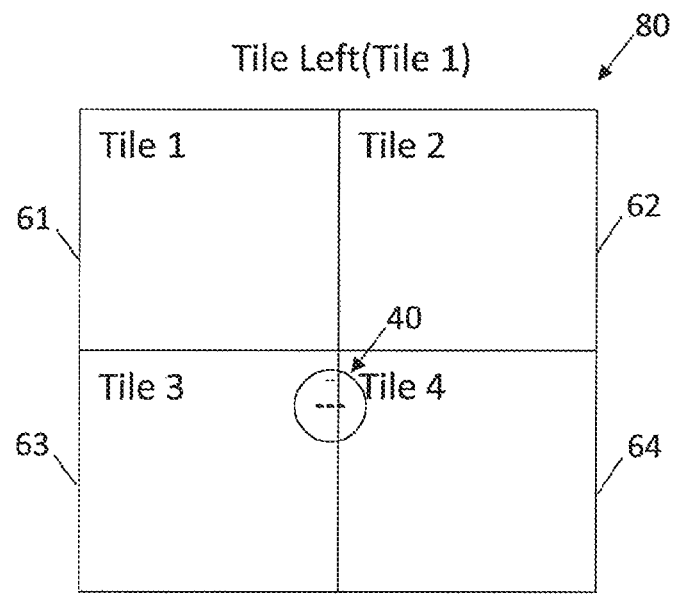

In FIG. 7 it is shown 80 that the group of vehicles has travelled from the first tile 61 to the third tile 63, and is currently located on the edge of the third tile 63. As such, the group of vehicles will transmit a tile left message to the V2V control entity, thereby indicating that the group has left the first tile 61. The tile left message may be answered, by the V2V control entity, in a second grant message, wherein the second grant message indicated the radio resources that may be used in the third tile 63.

Figure 8:
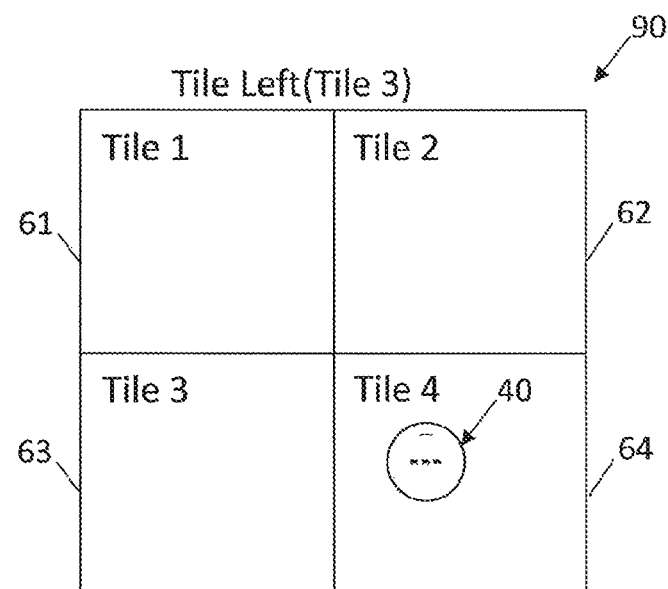

In FIG. 8, it is shown 90 that the group of vehicles has also left the third tile 63, and that the group of vehicles currently reside in the fourth tile 64. Again, the group of vehicles 40 has sent of tile left message for indicating that it has left the third tile 63, similar to the case as shown in FIG. 7.

Figure 9:
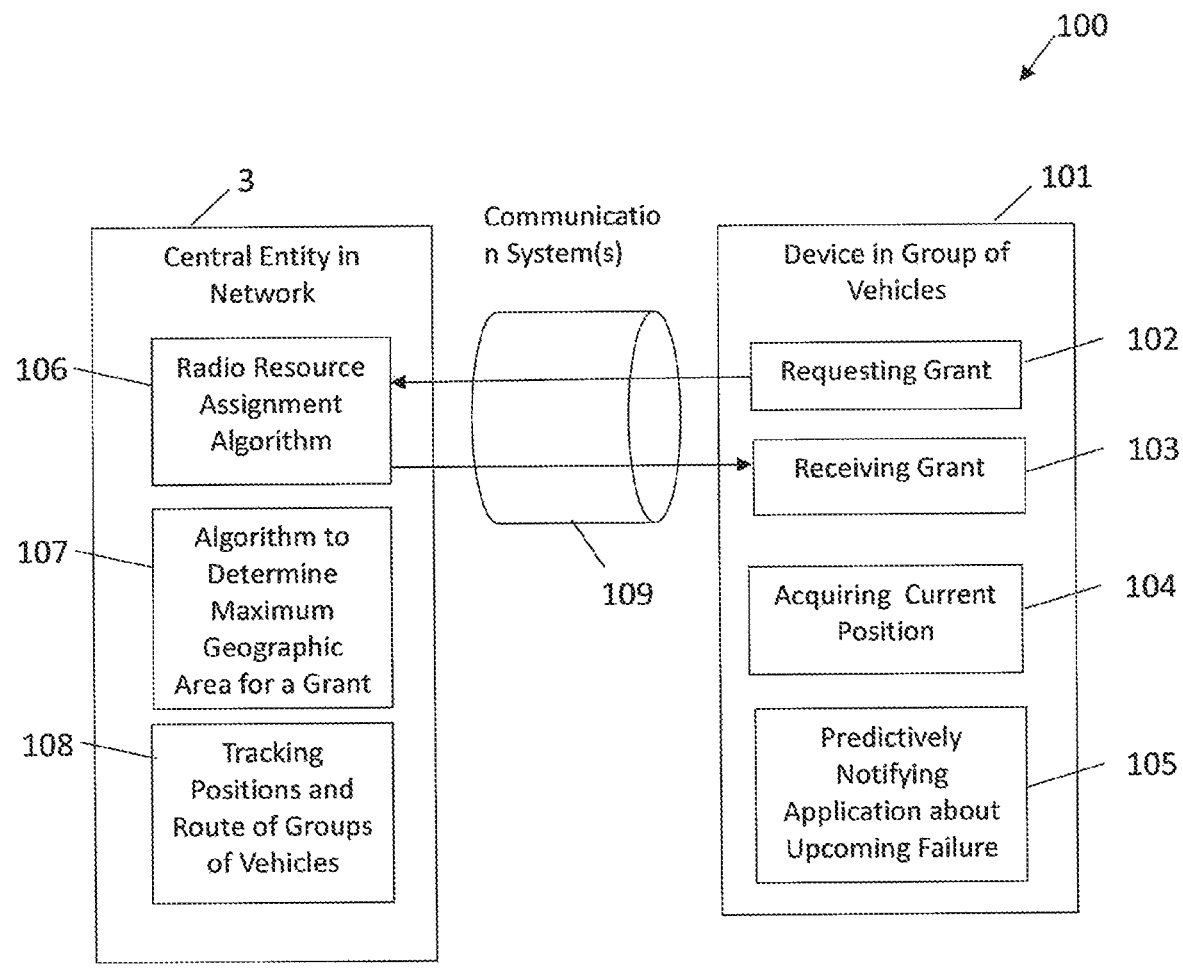
FIG. 9 discloses the general concept of the present disclosure.

FIG. 9 discloses the general concept 100 of the present disclosure. This present disclosure refers to a "group of vehicles" 101, for example a truck platoon and treats it as a single entity, as depicted in FIG. 9. Details about which truck(s) actually execute(s) the communication with the V2V control entity in the network and how, if necessary, the outcome of this communication is disseminated among all vehicles in the group is not relevant for the present disclosure. This can be for example solved by one truck being the leader 101 of the group of vehicles and executing the communication on behalf of the group. Furthermore, once locally exclusive sidelink radio resources were granted, sidelink Mode 4 (ad-hoc) scheduling can be used within these resources.

A group of vehicles 100 may want to conduct sidelink communication and therefore requests 102 sidelink radio resources from the V2V control entity 3 in the network. The group of vehicles will therefore send a ResourceRequest message 102 to the V2V control entity 3 in the network. The message may include the amount of requested resources, position and route of the group of vehicles. Upon receiving the request, the V2V control entity in the network may execute the Radio Resource Assignment Algorithm:

If there are at least as much resources in the pool of resources not assigned to any group of vehicles as requested, the V2V control entity 3 may assign 106 the requested amount of resources from that pool. They will then be removed from the pool.

Else, any resources assigned to groups of vehicles within close proximity, for example determined by overlapping area of interference, may be excluded from the set of candidate resources. For the remaining candidate resources:

Option 1—without exploiting the route information:

The V2V control entity in the network may assign the resources where the next group of vehicles using the same, wherein the "same" means at least one identical radio resource is used, resources is as far away as possible, for example according to last known position, from the group of vehicles requesting radio resources. This can be realized by a brute force algorithm enumerating and evaluating all possible options and selecting the best one. Faster performing algorithms are not precluded.

Option 2; exploiting the route information:

Same as Option 1 but not only using the last known position of the groups of vehicles but also the estimated future ones by exploiting the route information. A brute force realization of the algorithm could:

For each considered radio resource determine all groups of vehicles currently using it according to assigned grants Determine how their position evolves over time using time steps with defined resolution and doing the same for the requesting group of vehicles. In each time step:

For each group of vehicles, check if the area of interference overlaps with the one of the requesting group of vehicles. If it does, remove the group of vehicles from the set.

When there is only one group of vehicles left besides the requesting group of vehicles:

Progress in time until either the maximum number of time steps is reached, or the area of interference of the last group of vehicles overlaps with the requesting group of vehicles. In the first case consider that overlap will not happen according to prediction. For the second case save the time step index in which the overlap happened.

Select resources where overlap will not happen according to prediction. In case such resources are not available: select resources with highest time index at which areas of interference overlapped.

In case above assignment algorithm finds suitable radio resources, the group of vehicles will receive a ResourceGrant message 103, over a telecommunication containing the granted resources and the maximum geographical area the grant is valid for.

The V2V control entity 3 may thus comprise a radio resource assignment algorithm 106, an algorithm to determine 107 maximum geographical area for a grant, for example a tile, and a tracking 108 of positions and route of groups of vehicles. The device in group of vehicles 101 may be able to acquire current position 104 and predictively notify application about upcoming failure 105.

Figure 10:
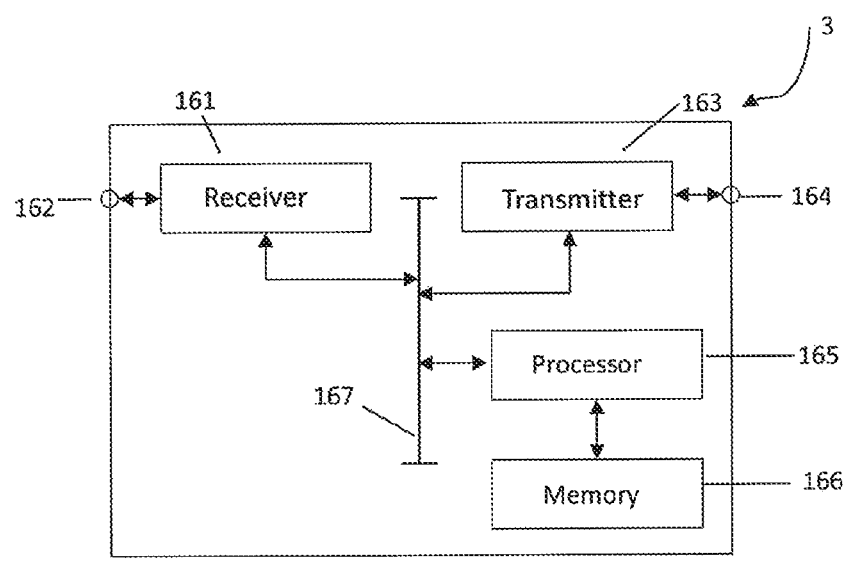
FIG. 10 discloses an example of a V2V control entity in accordance with the present disclosure.

FIG. 10 discloses an example of an V2V control entity 3 in accordance with the present disclosure.

The V2V control entity 3 is arranged to be operative in a core network of a telecommunication network, or operative in a private or public data network which is reachable via the core network, and arranged for allocating sidelink radio resources to a group of vehicles, wherein vehicles within said group of vehicles intent to use said sidelink for vehicle-to-vehicle, V2V, communication.

The entity 3 comprising:
  receive equipment 161 arranged for receiving, via a receiving terminal 162, a resource request, from said group of vehicles, for requesting radio resources to be used for said V2V communication;
  process equipment 165, in communication with a memory 166, arranged for determining radio resources to be used for said V2V communication;
  transmit equipment 163 arranged for transmitting, via a transmit terminal 164, to said group of vehicles, a resource grant comprising said determined radio resources.

Figure 11:
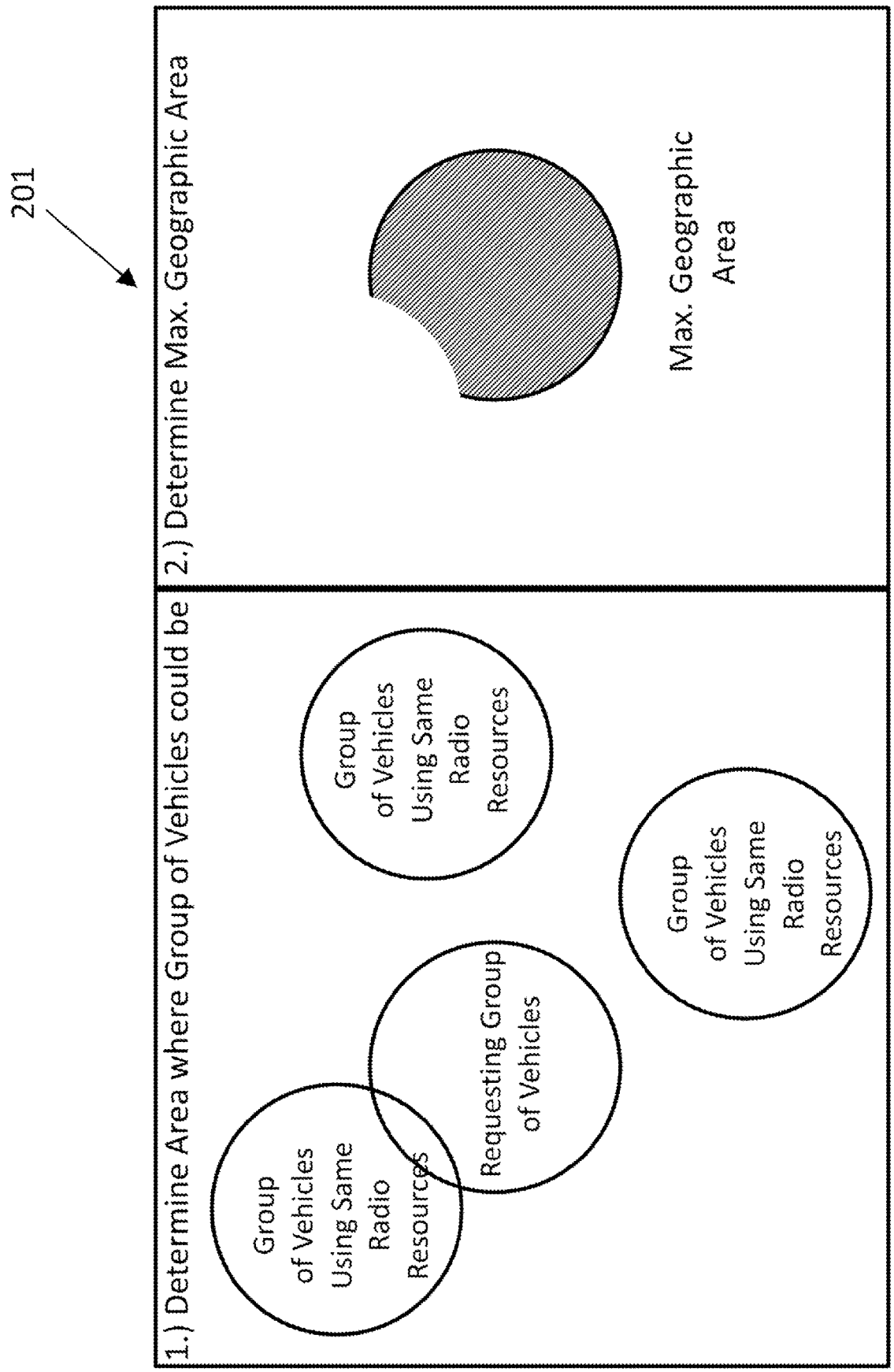
FIG. 11 discloses an example of how a V2V control entity determines the max. geographical area in which allocated resources are granted to be used.

FIG. 11 discloses an example 201 of how a V2V control entity determines the max. geographical area in which allocated resources are granted to be used.

The example 201 consists of two steps. In a first step an area is determined where the group of vehicles could be and in a second step the max geographical area in which allocated resources are granted to be used is determined.

In the first step, four groups of vehicles are displayed. Each of these groups of vehicles use, or intend to use, the same radio resources. The "requesting group of vehicles" is the group that is actually requesting resources, from the V2V control entity, that is can use for V2V communication.

The V2V control entity has selected/assigned/allocated particular radio resources. In this situation, the radio resources that have been assigned are thus also shared by the other three groups. Then, the max. geographical area is to be determined in which the radio resources may be used by the requesting group of vehicles. As shown, the requesting group of vehicles has associated therewith a particular area that overlaps with the area of one other group. This could potentially cause interference. As such, the V2V entity has cut out the overlapping area as shown in the second step. The requesting group of vehicles is thus allowed to use the allocated radio resources in the shaded area as shown in step two.

In accordance with the present disclosure it is noted that the V2V entity may provide a geographical area indication to the requesting group of vehicles, wherein the geographical area indication indicates the area in which the group of vehicles is granted to use the allocated radio resources. The geographical area indication may be associated with a tile, with a cell, or with any other geographical shape.

It is noted that the geographical shape of the geographical area indication may not necessarily be static, but can also be dynamic. This means that the geographical area indication may be determined, by the V2V control entity, based on already allocated radio resources. The size of the geographical area indication may also differ between the groups of vehicles. It could be the case that for a particular group of vehicles the geographical area indication is relatively small as the same radio resources have been allocated to another group of vehicles which is in close proximity thereof. It could also be the case that for the particular group of vehicles, the geographical are indication is relatively large as there is no risk to interference from other groups of vehicles, in the proximity, that share the same radio resource.

The max geographical area thus does not need to be circular, but can have any shape.

Other variations to the disclosed examples can be understood and effected by those skilled in the art in practicing the claimed disclosure, from a study of the drawings, the disclosure and the appended claims. In the claims, the word "comprising" does not exclude other elements or steps and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

A computer program may be stored/distributed on a suitable medium, such as optical storage medium or a solid-state medium supplied together with or as part of other hardware, but may also be distributed in other forms, such as via the Internet or other wired or wireless telecommunication systems. Any reference signs in the claims should not be construed as limiting scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method of operating a vehicle-to-vehicle ("V2V") control entity of a communications network for allocating sidelink radio resources to a group of vehicles that includes vehicles that intend to use the sidelink radio resources for V2V communication, the method comprising:
  receiving a resource request from the group of vehicles, the resource request requesting an indication of radio resources to be used for the V2V communication;
  determining the radio resources to be allocated for the V2V communication;
  transmitting a resource grant to the group of vehicles, the resource grant comprising:
    the indication of the radio resources;
    a grant renewal period indicator indicating a time period for which the radio resources are granted to be used; and
    a geographical area indication for which the radio resources are granted to be used.

2. The method of claim 1, wherein the resource request comprises a position indication indicating a geographical position of the group of vehicles, and
  wherein determining the radio resources comprises determining the radio resources to be used for the V2V communication based on the position indication.

3. The method of claim 1, wherein the V2V control entity comprises a database having stored therein allocated radio resources including stored geographical area resources,
  wherein each stored geographical area resource of the stored geographical area resources is associated with a particular geographical area indication, and wherein determining the radio resources comprises determining the radio resources to be used for the V2V communication based on the allocated radio resources per geographical area.

4. The method of claim 3, wherein determining the radio resources comprises determining the geographical area indication for which the radio resources are valid based on the allocated radio resources.

5. The method of claim 1, the method further comprises:
receiving a tile left message indicating that the group of vehicles are no longer within, or bound to leave, the geographical area indication such that the radio resources for the group of vehicles may be freed.

6. The method of claim 1, wherein the radio resources comprise at least one of:
a frequency allocation,
a channel allocation,
a subcarrier allocation,
a timeslot allocation,
a timeslot pattern allocation, and
Physical Resource Blocks ("PRBs") forming Transport Blocks ("TBs") carrying transmitted data.

7. The method of claim 2, wherein the resource request comprises a route indication indicating a route of the group of vehicles, and
wherein determining the radio resources comprises determining the radio resources to be used for the V2V communication based on the position indication and the route indication.

8. A vehicle-to-vehicle ("V2V") control entity of a communications network configured to allocate sidelink radio resources to a group of vehicles that includes vehicles that intend to use the sidelink radio resources for V2V communication, the V2V control entity comprising:
a processor; and
memory coupled with the processor, the memory having instructions stored therein that are executable by the processor to cause the V2V control entity to perform operations comprising:
receiving a resource request from the group of vehicles, the resource request requesting an indication of radio resources to be used for the V2V communication;
determining the radio resources to be allocated for the V2V communication;
determining a geographical area indication for which the radio resources are valid; and
transmitting a resource grant to the group of vehicles, the resource grant comprising:
the indication of the radio resources;
a grant renewal period indicator indicating a time period for which the radio resources are granted to be used; and
the geographical area indication for which the radio resources are granted to be used.

9. The V2V control entity of claim 8, wherein the resource request comprises a position indication indicating a geographical position of the group of vehicles, and
wherein determining the radio resources comprises determining the radio resources to be used for the V2V communication based on the position indication.

10. The V2V control entity of claim 9, wherein the resource request comprises a route indication for indicating a route of the group of vehicles, and
wherein determining the radio resources comprises determining the radio resources to be used for the V2V communication based on the position indication and the route indication.

11. The V2V control entity of claim 8, wherein the V2V control entity comprises a database having stored therein allocated radio resources per geographical area indication, and
wherein determining the radio resources comprise determining the radio resources to be used for the V2V communication based on the allocated radio resources per geographical area.

12. The V2V control entity of claim 8, the operations further comprising:
receiving a tile left message indicating that the group of vehicles are no longer within, or bound to leave, the geographical area indication such that the resources for the group of vehicles may be freed.

13. The V2V control entity of claim 8, wherein the radio resources comprise-at least one of:
a frequency allocation,
a channel allocation,
a subcarrier allocation,
a timeslot allocation,
a timeslot pattern allocation, and
Physical Resource Blocks ("PRBs") forming Transport Blocks ("TBs") carrying transmitted data.

14. A system comprising a plurality of vehicle-to-vehicle ("V2V") control entities of a communications network that are each configured to allocate sidelink radio resources to a group of vehicles that includes vehicles that intend to use the sidelink radio resources for V2V communication, each of the V2V control entities are separate, distinctive, entities for improving redundancy, and each of the V2V control entities comprise:
a processor;
a databased coupled to the processor and having an indication of allocated radio resources per geographical area indication stored therein; and
memory coupled with the processor, the memory having instructions stored therein that are executable by the processor to cause the V2V control entity to perform operations comprising:
receiving a resource request from the group of vehicles, the resource request requesting an indication of radio resources to be used for the V2V communication;
determining the radio resources to be allocated for the V2V communication based on the allocated radio resources per geographical area;
determining a geographical area indication for which the radio resources are valid based on the indication of the allocated radio resources per geographical area; and
transmitting a resource grant to the group of vehicles, the resource grant comprising:
the indication of the radio resources;
a grant renewal period indicator indicating a time period for which the radio resources are granted to be used; and
the geographical area indication for which the radio resources are granted to be used.

15. The system of claim 14, wherein the resource request comprises a position indication for indicating a geographical position of the group of vehicles, and
wherein determining the radio resources further comprises determining the radio resources to be used for the V2V communication based on the position indication.

16. The system of claim 14, the operations further comprising:
receiving a tile left message indicating that the group of vehicles are no longer within, or bound to leave, the geographical area indication such that the radio resources for the group of vehicles may be freed.

17. A non-transitory computer-readable medium having instructions stored therein that are executable by processing circuitry of a vehicle-to-vehicle ("V2V") control entity to cause the V2V entity to perform operations comprising:
receiving a resource request from the group of vehicles, the resource request requesting an indication of radio resources to be used for the V2V communication;
determining the radio resources to be allocated for the V2V communication;
transmitting a resource grant to the group of vehicles, the resource grant comprising:
the indication of the radio resources;
a grant renewal period indicator indicating a time period for which the radio resources are granted to be used; and
a geographical area indication for which the radio resources are granted to be used; and
receiving a tile left message indicating that the group of vehicles are no longer within, or bound to leave, the geographical area indication such that the radio resources for the group of vehicles may be freed.

18. The non-transitory computer-readable medium of claim 17, wherein the resource request comprises a position indication for indicating a geographical position of the group of vehicles, and
wherein determining the radio resources further comprises determining the radio resources to be used for the V2V communication based on the position indication.

19. The non-transitory computer-readable medium of claim 17, wherein the V2V control entity comprises a database having stored therein allocated radio resources including stored geographical area resources,
wherein each stored geographical area resource of the stored geographical area resources is associated with a particular geographical area indication, and
wherein determining the radio resources comprises determining the radio resources to be used for the V2V communication based on the allocated radio resources per geographical area.

20. The non-transitory computer-readable medium of claim 19, wherein determining the radio resources comprises determining a geographical area indication for which the radio resources are valid based on the allocated radio resources.

* * * * *